United States Patent [19]

Chang

[11] Patent Number: 5,718,134

[45] Date of Patent: Feb. 17, 1998

[54] BICYCLE CABLE LOCK

[76] Inventor: Chin-Shu Chang, 58, Ma Yuan West St., Taichung, Taiwan

[21] Appl. No.: 756,899

[22] Filed: Dec. 13, 1996

[51] Int. Cl.$^6$ ............................................. B62H 5/00
[52] U.S. Cl. ............................ 70/233; 70/18; 70/49
[58] Field of Search ...................... 70/14, 18, 19, 70/30, 49, 233, 57, 58, 225, 226, 227

[56] References Cited

U.S. PATENT DOCUMENTS

| | | | |
|---|---|---|---|
| 3,788,108 | 1/1974 | Norcross | 70/233 |
| 3,824,540 | 7/1974 | Smith, II | 70/233 X |
| 4,028,916 | 6/1977 | Pender | 70/233 |
| 4,945,739 | 8/1990 | Prindle | 70/233 |
| 5,291,765 | 3/1994 | Hoisington | 70/233 |
| 5,405,113 | 4/1995 | Jaw | 70/233 X |
| 5,408,212 | 4/1995 | Meyers et al. | 70/233 X |
| 5,598,727 | 2/1997 | White | 70/233 |
| 5,653,365 | 8/1997 | Lee | 70/233 X |

FOREIGN PATENT DOCUMENTS

| | | | |
|---|---|---|---|
| 3102926 | 9/1982 | Germany | 70/233 |
| 3913471 | 3/1990 | Germany | 70/233 |
| 4000430 | 7/1991 | Germany | 70/233 |
| 4321635 | 3/1994 | Germany | 70/233 |

Primary Examiner—Suzanne Dino

[57] ABSTRACT

A bicycle cable lock comprises a hollow socket, a positioning seat disposed on the hollow socket, a U-shaped clamp seat disposed on the positioning seat, and a cable positioned by the U-shaped clamp seat. The cable has two loops. The loops are locked by a padlock.

3 Claims, 6 Drawing Sheets

BICYCLE CABLE LOCK

BACKGROUND OF THE INVENTION

The present invention relates to a bicycle cable lock. More particularly, the present invention relates to a bicycle cable lock which can be used safely.

The conventional locks for bicycles comprise chain locks, numeral locks and bicycle cable locks. Referring to FIG. 1, the conventional bicycle cable lock A has two loops. A padlock locks the loops of the conventional bicycle cable lock A. The conventional bicycle cable lock A can be elongated, so the conventional bicycle cable lock A is superior to the chain lock and the numeral lock. However, the cable is very long so that the conventional bicycle cable lock A may stumble the user while it is not used.

SUMMARY OF THE INVENTION

An object of the present invention is to provide a bicycle cable lock which can be used safely.

Another object of the present invention is to provide a bicycle cable lock which has a cable to occupy a small room while using.

Accordingly, a bicycle cable lock comprises a hollow socket, a positioning seat disposed on the hollow socket, a U-shaped clamp seat disposed on the positioning seat, and a cable positioned by the U-shaped clamp seat. The cable has two loops disposed at two opposite ends of the cable. The loops are locked by a padlock. The hollow socket has a first outer flange, a second outer flange, a slot defined by the first outer flange and the second outer flange, an inner pad inserted in the hollow socket, and a mount disposed on an outer periphery of the hollow socket. A first hexagonal hole is formed on the first outer flange. A second hexagonal hole is formed on the second outer flange. A tube of a bicycle passes through the inner pad. A first bolt passes through the first hexagonal hole and the second hexagonal hole to be fastened by a first nut. A first aperture and a second aperture are formed on the mount. The positioning seat has a disk disposed on the mount, a hollow base, and a spring, a cage block and a press plate disposed between the disk and the hollow base. A positioning block is disposed on the disk. The positioning block is inserted in the spring. The cage block has a main body, an extended rod disposed on a periphery of the main body, a first protruded plate disposed on a top portion of the main body, a second protruded plate disposed on a bottom of the main body, a first recess hole formed on the first protruded plate, and a second recess hole formed on the second protruded plate. The spring abuts the main body of the cage block. The press plate has a press edge, a notch, a first rib disposed on a top portion of the press plate, and a second rib disposed on a bottom of the press plate. The hollow base has a first lobe, a second lobe, a cross-shaped recess and a rectangular hole. A first round hole is formed on the first lobe. A second round hole is formed on the second lobe. A through hole is formed on the hollow base. The U-shaped clamp seat has an opening, a plurality of guide grooves, and a lateral plate. A first lateral flange and a second lateral flange are disposed on the lateral plate. A circular hole and a rectangular groove are formed on the lateral plate. The extended rod passes through the press plate and the through hole. A second bolt passes through the first aperture and the first round hole to be fastened by a second nut. A third bolt passes through the second aperture and the second round hole to be fastened by a third nut. The cable is winded on the U-shaped clamp seat.

DETAILED DESCRIPTION OF THE INVENTION

Figure 1:
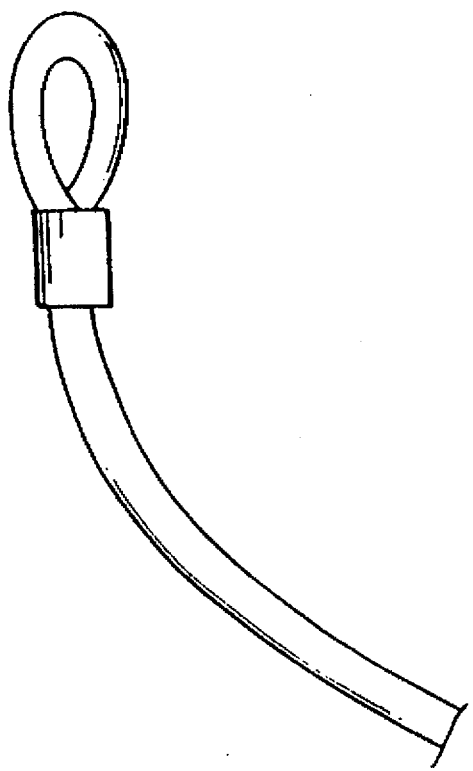
FIG. 1 is a partially perspective view of a bicycle cable lock of the prior art.
Figure 1:
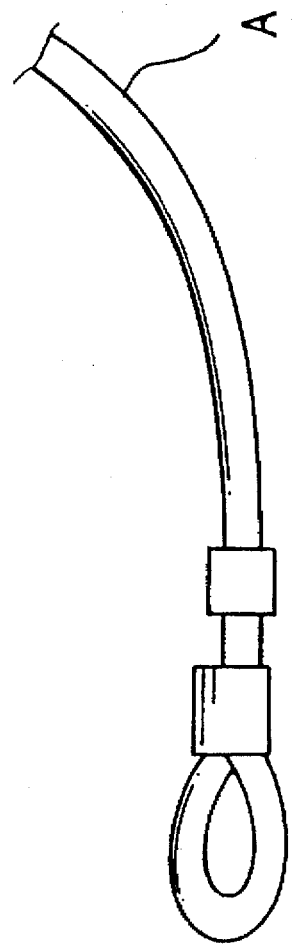
Figure 2:
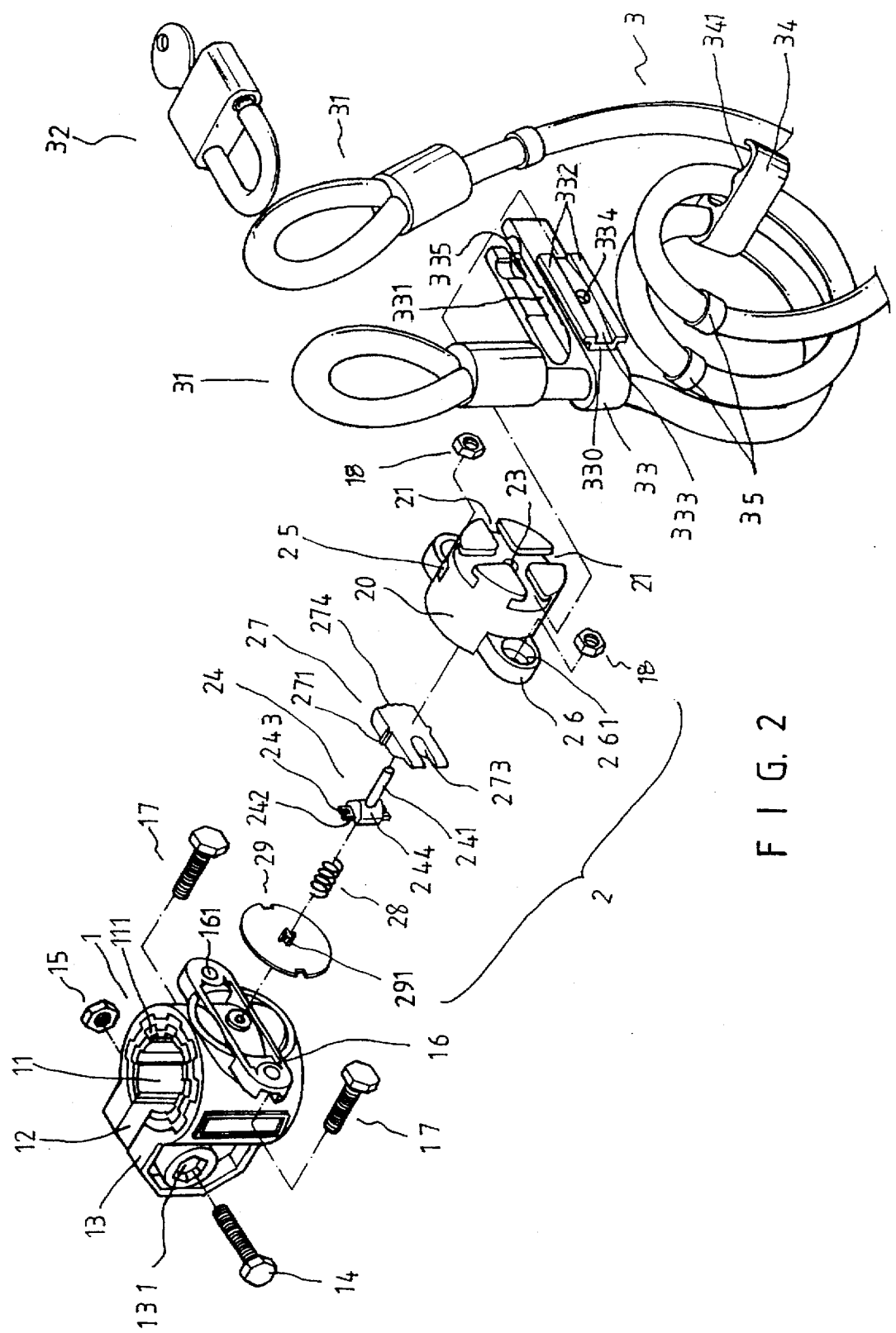
FIG. 2 is a perspective exploded view of a bicycle cable lock of a preferred embodiment in accordance with the present invention.
Figures 3, 3A:
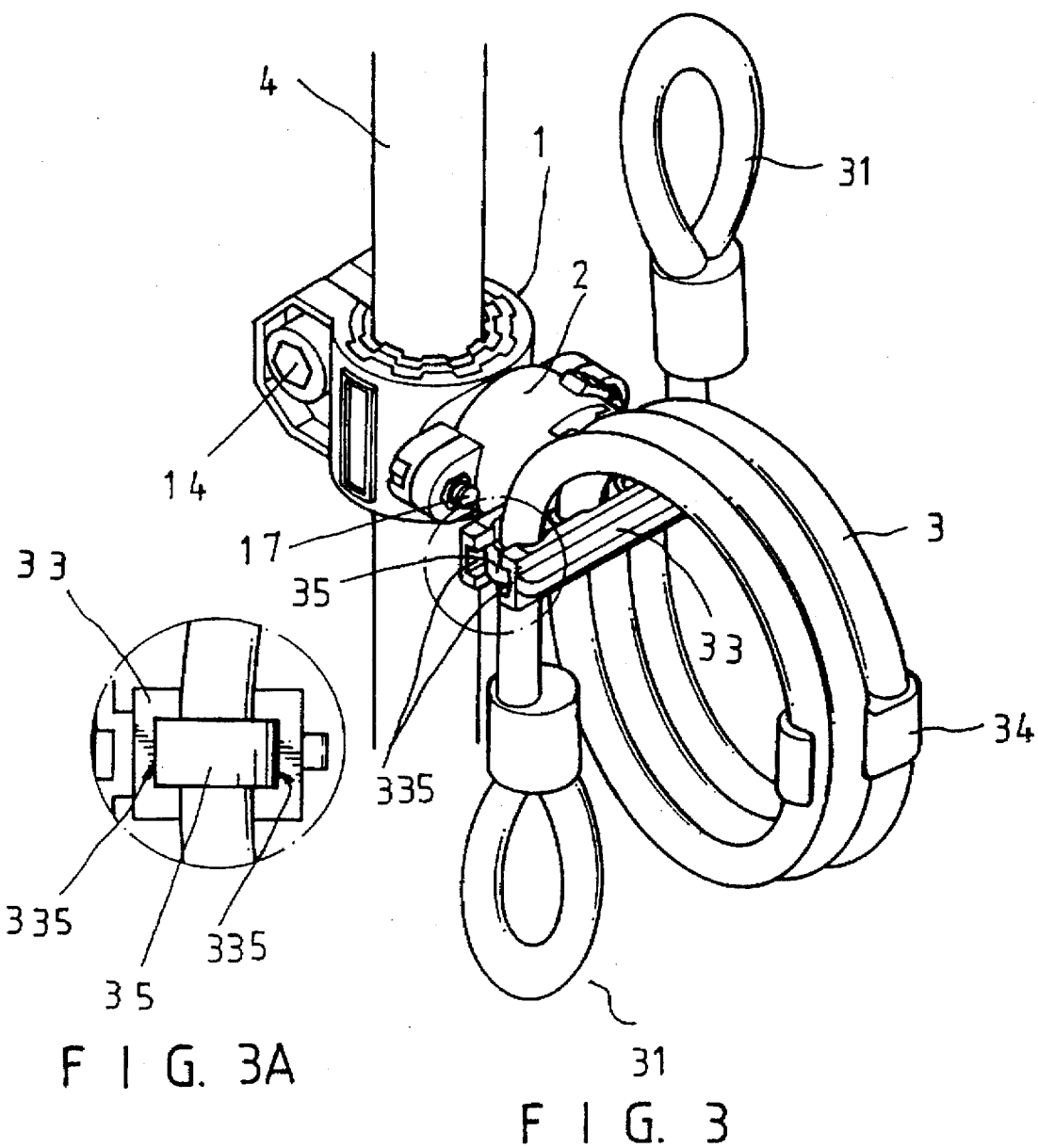
FIG. 3 is a perspective assembly view of a bicycle cable lock of a preferred embodiment in accordance with the present invention.
FIG. 3A is an enlarged view of a positioning ring inserted in the corresponding guide groove.
Figure 4:
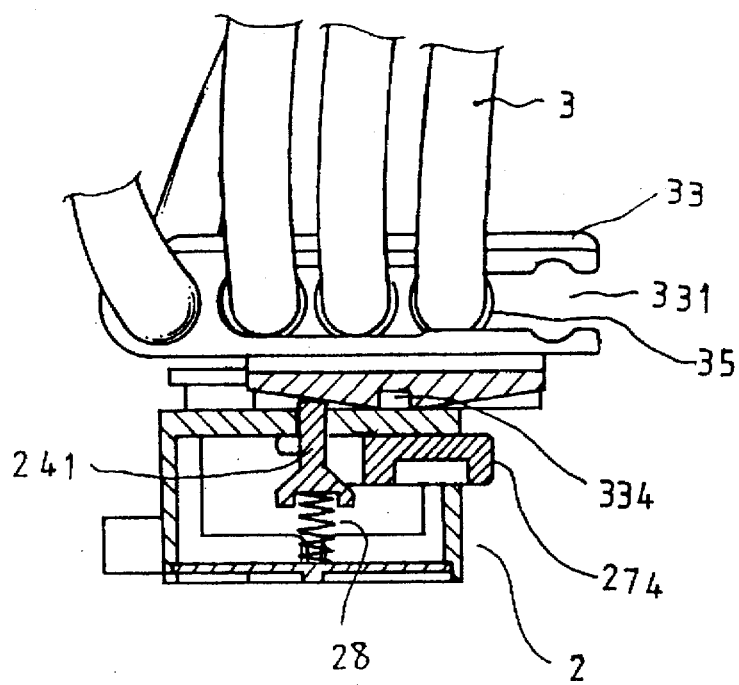
FIG. 4 is a partially sectional schematic view illustrating an operation of a bicycle cable lock of a preferred embodiment in accordance with the present invention.

Referring to FIGS. 2 to 3A, a bicycle cable lock comprises a hollow socket 1, a positioning seat 2 disposed on the hollow socket 1, a U-shaped clamp seat 33 disposed on the positioning seat 2, and a cable 3 positioned by the U-shaped clamp seat 33. The cable 3 has two loops 31 disposed at two opposite ends of the cable 3. The loops 31 are locked by a padlock 32. The hollow socket 1 has a first outer flange 13, a second outer flange 13, a slot 12 defined by the first outer flange 13 and the second outer flange 13, an inner pad 111 inserted in the hollow socket 1, and a mount 16 disposed on an outer periphery of the hollow socket 1. A first hexagonal hole 131 is formed on the first outer flange 13. A second hexagonal hole 131 is formed on the second outer flange 13. A tube 4 of a bicycle passes through the inner pad 111. A first bolt 14 passes through the first hexagonal hole 131 and the second hexagonal hole 131 to be fastened by a first nut 15. A first aperture 161 and a second aperture 161 are formed on the mount 16. The positioning seat 2 has a disk 29 disposed on the mount 16, a hollow base 20, and a spring 28, a cage block 24 and a press plate 27 disposed between the disk 29 and the hollow base 20. A positioning block 291 is disposed on the disk 29. The positioning block 291 is inserted in the spring 28. The cage block 24 has a main body 244, an extended rod 241 disposed on a periphery of the main body 244, a first protruded plate 242 disposed on a top portion of the main body 244, a second protruded plate 242 disposed on a bottom of the main body 244, a first recess hole 243 formed on the first protruded plate 242, and a second recess hole 243 formed on the second protruded plate 242. The spring 28 abuts the main body 244 of the cage block 24. The press plate 27 has a press edge 274, a notch 273, a first rib 271 disposed on a top portion of the press plate 27, and a second rib 271 disposed on a bottom of the press plate 27. The hollow base 20 has a first lobe 26, a second lobe 26, a cross-shaped recess 21 and a rectangular hole 25. A first round hole 261 is formed on the first lobe 26. A second round hole 261 is formed on the second lobe 26. A through hole 23 is formed on the hollow base 20. The U-shaped clamp seat 33 has an opening 331, a plurality of guide grooves 335, and a lateral plate 330. A first lateral flange 332 and a second lateral flange 332 are disposed on the lateral plate 330. A circular hole 334 and a rectangular groove 333 are formed on the lateral plate 330. The first lateral flange 332 is inserted in the cross-shaped recess 21. The extended rod 241 passes through the press plate 27, the through hole 23 and the circular hole 334. A second bolt 17 passes through the first aperture 161 and the first round hole 261 to be fastened by a second nut 18. A third bolt 17 passes through the second aperture 161 and the second round hole 261 to be fastened by a third nut 18. The cable 3 can be winded on the U-shaped clamp seat 33.

Referring to FIGS. 3 to 6, a plurality of positioning rings 35 are disposed on the cable 3. A cage seat 34 is disposed on the cable 3. The cage seat 34 has a plurality of cage grooves 341. The positioning rings 35 are inserted in the corresponding guide grooves 335. The cage grooves 341 receives the winded cable 3.

Figure 5:
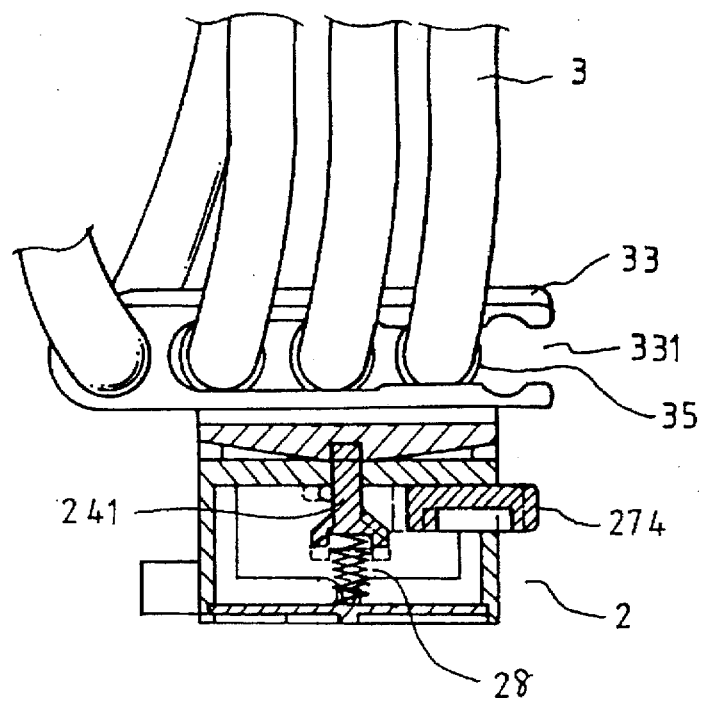
FIG. 5 is another partially sectional schematic view illustrating an operation of a bicycle cable lock of a preferred embodiment in accordance with the present invention.
Figure 6:
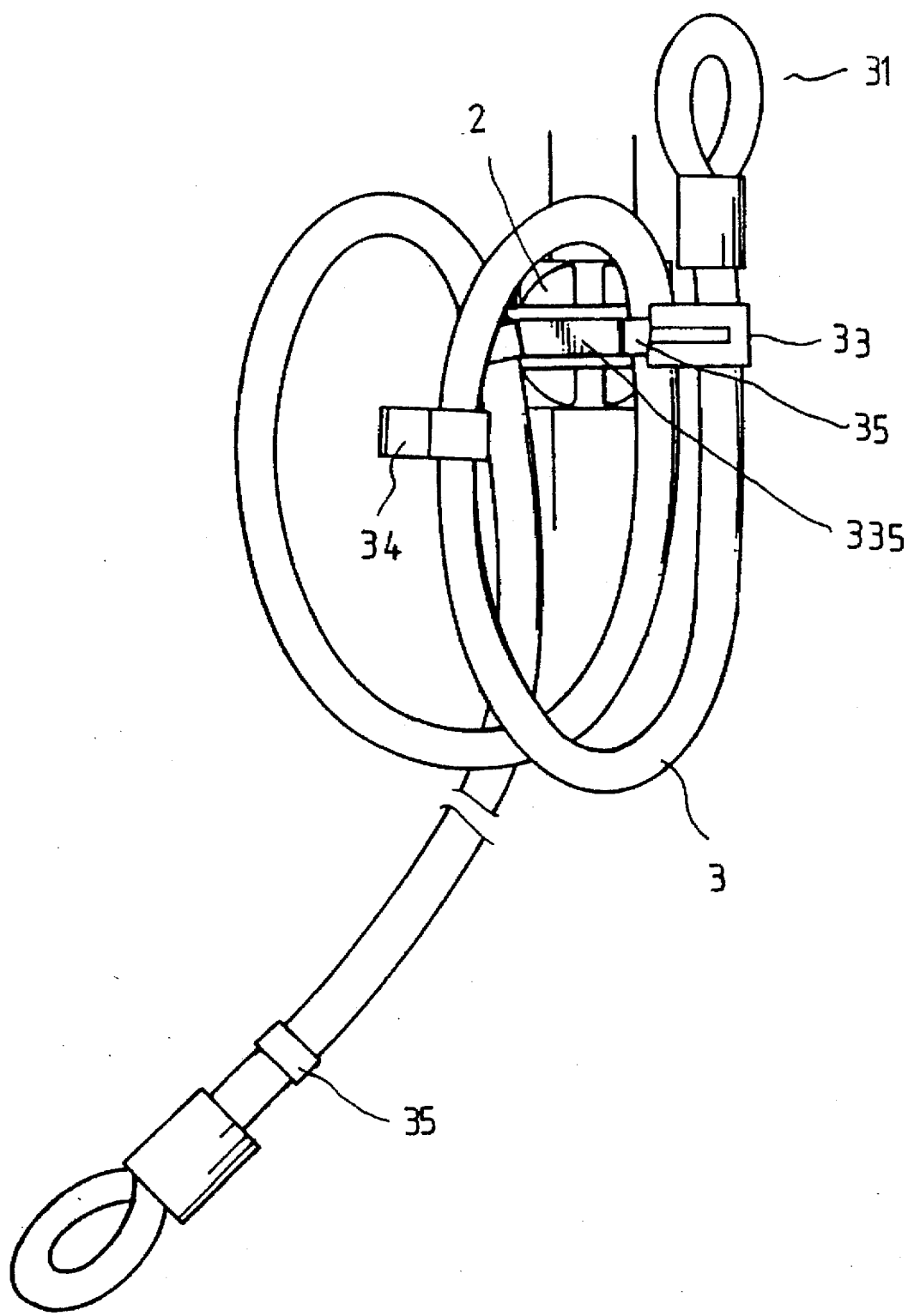
FIG. 6 is a schematic view illustrating an operation of a bicycle cable lock of a preferred embodiment in accordance with the present invention.

Referring to FIG. 5, the press plate 27 is pressed so that the extended rod 241 disengages from the circular hole 334 and the through hole 23. The lateral plate 330 disengages from the cross-shaped recess 21.

Figure 7:
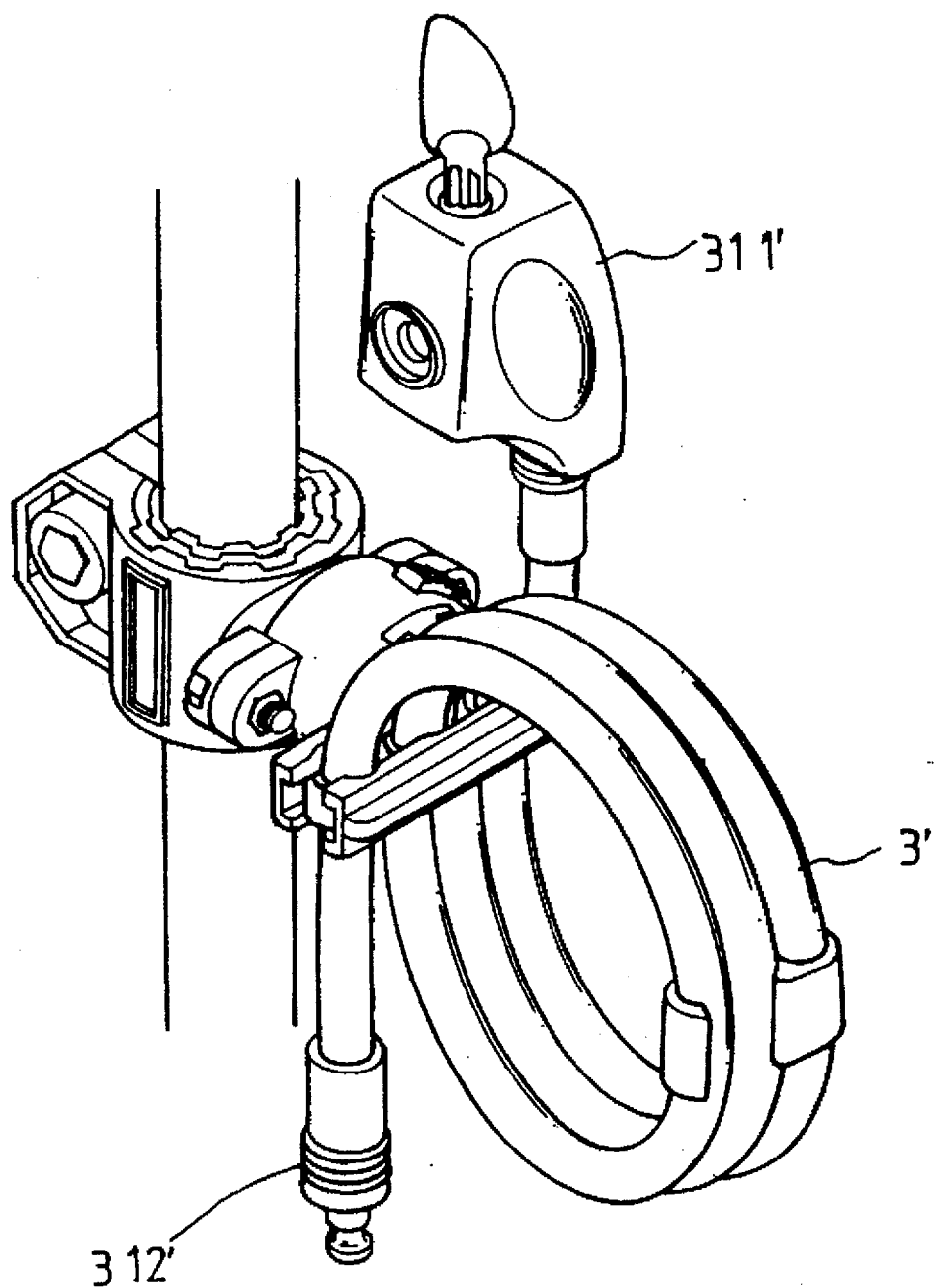
FIG. 7 is a perspective assembly view of a bicycle cable lock of another preferred embodiment in accordance with the present invention.

Referring to FIG. 7, a lock head 311' and a lock bolt 312' are disposed at two opposite ends of a cable 3' respectively.

The invention is not limited to the above embodiment but various modification thereof may be made. Further, various changes in form and detail may be made without departing from the scope of the invention.

I claim:

1. A bicycle cable lock comprising:

a hollow socket, a positioning seat disposed on the hollow socket, a U-shaped clamp seat disposed on the positioning seat, and a cable;

the cable having two loops disposed at two opposite ends of the cable, the hollow socket having a first outer flange, a second outer flange, a slot defined by the first outer flange and the second outer flange, an inner pad inserted in the hollow socket, and a mount disposed on an outer periphery of the hollow socket, a first hexagonal hole formed on the first outer flange, a second hexagonal hole formed on the second outer flange, a tube of a bicycle passing through the inner pad, a first bolt passing through the first hexagonal hole and the second hexagonal hole to be fastened by a first nut, a first aperture and a second aperture formed on the mount, the positioning seat having a disk disposed on the mount, a hollow base, and a spring, a cage block and a press plate disposed between the disk and the hollow base, a positioning block disposed on the disk, the positioning block inserted in the spring, the cage block having a main body, an extended rod disposed on a periphery of the main body, a first protruded plate disposed on a top portion of the main body, a second protruded plate disposed on a bottom of the main body, a first recess hole formed on the first protruded plate, and a second recess hole formed on the second protruded plate, the spring abutting the main body of the cage block, the press plate having a press edge, a notch, a first rib disposed on a top portion of the press plate, and a second rib disposed on a bottom of the press plate, the hollow base having a first lobe, a second lobe, a cross-shaped recess and a rectangular hole, a first round hole formed on the first lobe, a second round hole formed on the second lobe, a through hole formed on the hollow base, the U-shaped clamp seat having an opening, a plurality of guide grooves, and a lateral plate, a first lateral flange and a second lateral flange disposed on the lateral plate, a circular hole and a rectangular groove formed on the lateral plate, the first lateral flange inserted in the cross-shaped recess, the extended rod passing through the press plate, the through hole, and the circular hole, a second bolt passing through the first aperture and the first round hole to be fastened by a second nut, a third bolt passing through the second aperture and the second round hole to be fastened by a third nut, and the cable winded on the U-shaped clamp seat.

2. A bicycle cable lock as claimed in claim 1, wherein a plurality of positioning rings are disposed on the cable.

3. A bicycle cable lock as claimed in claim 1, wherein a cage seat is disposed on the cable.

* * * * *